INVENTOR
GEORGE A. LATINEN

BY John W. Klooster
ATTORNEY

INVENTOR.
JAMES Y. CHEN

FIG. 10

United States Patent Office 3,794,471
Patented Feb. 26, 1974

3,794,471
CONTINUOUS POLYMERIZATION APPARATUS
George A. Latinen, deceased, late of Springfield, Mass., by May V. Latinen, administratrix, Springfield, Mass., assignor to Monsanto Company, St. Louis, Mo.
Filed Aug. 16, 1971, Ser. No. 172,145
Int. Cl. C08f 1/98
U.S. Cl. 23—285
8 Claims

ABSTRACT OF THE DISCLOSURE

Apparatus for continuous mass polymerization under conditions which are substantially isothermal and substantially homogeneous with respect to composition adapted for use with high viscosity polymerizing fluid masses with a vapor space thereabove with remarkably high rates of thermal energy removal. The apparatus employs a reactor wherein there is a paddle assembly adapted to produce in a highly viscous fluid a combination of cyclical vertical mixing, rolling action and axial recirculaton. The reactor is equipped with a reflux condenser and control means regulating the amount of polymer withdrawn from the reactor when in use during polymerization.

RELATED APPLICATIONS

A sub-assembly used in the apparatus combination comprising the present invention (which sub-assembly is the mixer/reactor) is disclosed, described and claimed in certain co-pending applications filed on even date herewith as follows: Ser. Nos. 172,059, 172,147, and 172,107.

BACKGROUND

The art of chemical engineering has heretofore appreciated that a reactor could be fitted with a condenser of the reflux type to provide a system which was capable of higher rates of thermal energy removal from the interior of the reactor than was possible through the use of a cooling jacket only on the reactor.

In the case of viscous fluid reaction masses, the art has heretofore experienced severe difficulty in mixing. Thus, such a viscous mass has conventionally required high to excessively greater energy requirements to revolve an agitator therein (or example, an anchor type agitator revolving on a vertical axis in a kettle), and there has a tendency for material hang-ups and even "dead" spots to occur in the viscous mass being mixed. It has been extremely difficult, if not impossible, to achieve homogeneity in a highly viscous mass by such conventional mechanical mixing alone.

If one equips a conventional reactor having a conventional agitator with a reflux condenser, one characteristically, in the case of highly viscous fluids, obtains neither homogeneity of composition nor homogeneity of temperature therein. Consequently, the art has heretofore not employed reactors equipped with reflux condensation means when making with agitated viscous fluids, especially highly viscous fluids.

Recently, however, there was discovered a new mixing or agitating technique which enables one to achieve substantially complete homogeneity within a viscous fluid mass.

It has now been discovered that, when one uses this new mixing technique (and the mixer/reactor configuration associated therewith) and equips the assembly with a reflux condenser and the appropriate associated hardware and control elements, there is produced unexpectedly and surprisingly an apparatus wherein one can achieve a viscous fluid system which is simultaneously substantially homogeneous with respect to temperature, conversion and composition. This apparatus is sufficiently inexpensive to be used for the production of low cost polymeric materials.

The apparatus of this invention is also unusually well suited for the production of polymers, such as polystyrene, having a surprisingly narrow molecular weight distribution in, for example, the molecular weight range of from about 20,000 to 100,000 Staudinger.

In making theromplastic polymers, it is highly desirable to have a uniform molecular weight distribution particularly because of the well defined melt flow characteristics associated therewith. If in a melt of polymer intended for use in a molding or extruding operation the molecular weight distribution is too broad, the polymer melt flow characteristics are variable and unpredictable; and it is difficult to properly adjust the molding and/or extruding equipment to compensate for such variability and unpredictability. Heretofore, in batch suspension and emulsion polymerization technology, for example, the art has known how to produce thermoplastic polymers having a desirably narrow molecular weight distribution; however, in recent years, owing to the process economies involved, the high polymer arts have tended to rely more and more on mass polymerization technology, especially continuous mass polymerization, to produce commodity quantities of thermoplastic polymers for use in the plastics industry.

In a continuous mass polymerization reactor, it is common to have a high viscosity fluid reaction system composed partly of polymer and partly of monomer to achieve a uniform molecular weight in such a viscous reaction mixture; and particularly in the polymer portion thereof, it is necessary to have the reaction mass maintained at substantially uniform polymerization conditions, particularly as regards temperature and pressure. In all prior art reactor assemblies known to me which are suitable for use in continuous mass polymerization reactions, it has been difficult, if not impossible, to achieve a polymer product in which there is a relatively narrow molecular weight distribution primarily because of the difficulties of precisely controlling at all points in such reactor the temperature and pressure conditions.

Thus, the reactor assembly of this invention enables one to conduct a mass polymerization reaction which inherently involves the use of a high viscosity reaction medium and to control such polymerization under very close temperature and pressure conditions. Through the use of the particular combination of reactor components employed and the reactor assembly of the present invention, it is now possible to maintain the entire contents of a reactor under substantially identical conditions in all portions thereof. Moreover, such uniformity of reaction conditions is achieved in a continuous manner and at highest possible reaction rates and reactor conversions which will give the desired molecular weight distribution desired.

SUMMARY

The present invention is directed to a reactor assembly adapted for use in isothermic mass polymerization reactions to produce a polymer product having a substantially uniform molecular weight and chemical composition.

This reactor assembly is adapted to receive liquefied vaporizable polymerizable monomeric materials in a relatively low viscosity fluid condition. The reactor assembly is further adapted to handle the polymer produced from the polymerization of such monomeric materials particularly when such polymeric product is in the physical form of a high viscosity fluid. Furthermore, the reactor assembly is adapted to maintain within a sealed chamber both a vapor phase consisting largely of the monomeric materials and a relatively viscous fluid consisting largely on a weight percent basis of polymer, the vapor phase, being located in the upper portion of the reactor interior, while the polymer portion being located in the lower portion of the reactor interior. The reactor assembly is adapted to maintain the viscous fluid mass in the lower portion of the reactor assembly under temperature and pressure conditions which are not only very closely controlled, but which are above the boiling point of the monomeric materials in the reactor.

The reactor assembly employs a housing. The housing encloses an elongated interior chamber which is generally cross-sectionally circular. The walls of this chamber are generally radially symmetrical to a longitudinal axis extending in a horizontal direction therethrough. The dimensions of such chamber are such that the ratio of the length of the longitudinal axis of such chamber to the maximum chamber diameter ranges from about 0.5 to 3.5.

Defined in the housing, one finds at least one input port located in the upper half thereof and at least one output port located in the lower half thereof.

The reactor assembly further employs a paddle assembly. This paddle assembly has a shaft which is located within the housing so as to be generally coaxial with the longitudinal axis of the housing. The shaft is journaled for rotational movements in the opposed end wall portions of the housing for shaft rotational movements. Appropriate seals for the shaft in the region of the housing end walls are provided.

In the shaft assembly, there is at least one pair of opposed blade members which are generally equally spaced one member from another. Each blade member is generally radially extending from the shaft to a point in proximity to the interior wall surfaces of the chamber, and each blade member axially extends substantially the entire length of the chamber.

Each pair of opposed blade members is slotted at diametrically opposite outside corners or end portions.

When a paddle assembly is mounted in a housing, the paddle assembly is adapted to impart to a fluid in the housing of relatively high viscosity during rotational movements of the shaft at angular velocities below the level of turbulent fluid flow; simultaneously, a combination of shear mixing, gravitational falling mixing, and axial flow mixing, such that portions of the fluid at the center of the chamber reach the end thereof in a longitudinally axially extending direction in about three-quarters of a single revolution of the shaft. The reactor assembly employs reflux condenser means. The reflux condenser means includes both tube means and pipe means. The tube means has exterior surfaces adapted to be cooled; the pipe means functionally interconnects the tube means with the chamber at an apex portion of the housing so that vapors may be removed from the chamber, condensed in the tube means, and returned to the chamber.

A drive assembly for driving the paddle assembly is provided with the reactor assembly. This drive means includes a power head and power transfer means functionally associated with the shaft on the paddle assembly.

Valve means is functionally associated with the pipe means in the reflux condenser means whereby the flow of vapors from the vapor space in an operating reactor assembly is controlled. The valve means is variable and is, in itself, regulated in its opening and closing movements by a temperature or pressure controller assembly. This temperature, or pressure controller assembly, is rendered operative by temperature sensing and/or pressure sensing means, as the case may be, located in the vapor space of the reactor.

Control means regulating flow of material from reactor to reflux condenser completes the apparatus.

DRAWINGS

The present invention is better understood by reference to the attached drawings wherein.

DETAILED DESCRIPTION

FIGS. 1-4 illustrate various apparatus configurations of the present invention. Each figure is labeled, so no detailed description thereof is given herein. Observe that the apparatus in each respective figure comprises a reactor assembly, a reflux condenser, and control means. The reactor assembly is described in greater detail hereinafter.

The control means is seen to regulate the quantity of vapor withdrawn from the reactor into the condenser. The control means includes:

(1) condition sensing means forsensing temperature and/or pressure in said housing and for generating a signal output representative thereof,
(2) variable valve means adapted to regulate the flow of vapor from said chamber into said condenser, and
(3) control means responsive to said signal output adapted to operate said variable valve means.

Conventional elements well known to those skilled in the art may be used here to accomplish the respective functions indicated.

The reflux condenser means is conventional and thus comprise tube means interconnected with the upper portion of said chamber, and means for cooling exterior surface portions of said tube means whereby, during operation of said apparatus, vapors may be removed from said chamber and condensed. Virtually any conventional reflux condenser may be used here, as those skilled in the art will appreciate.

Figure 5:
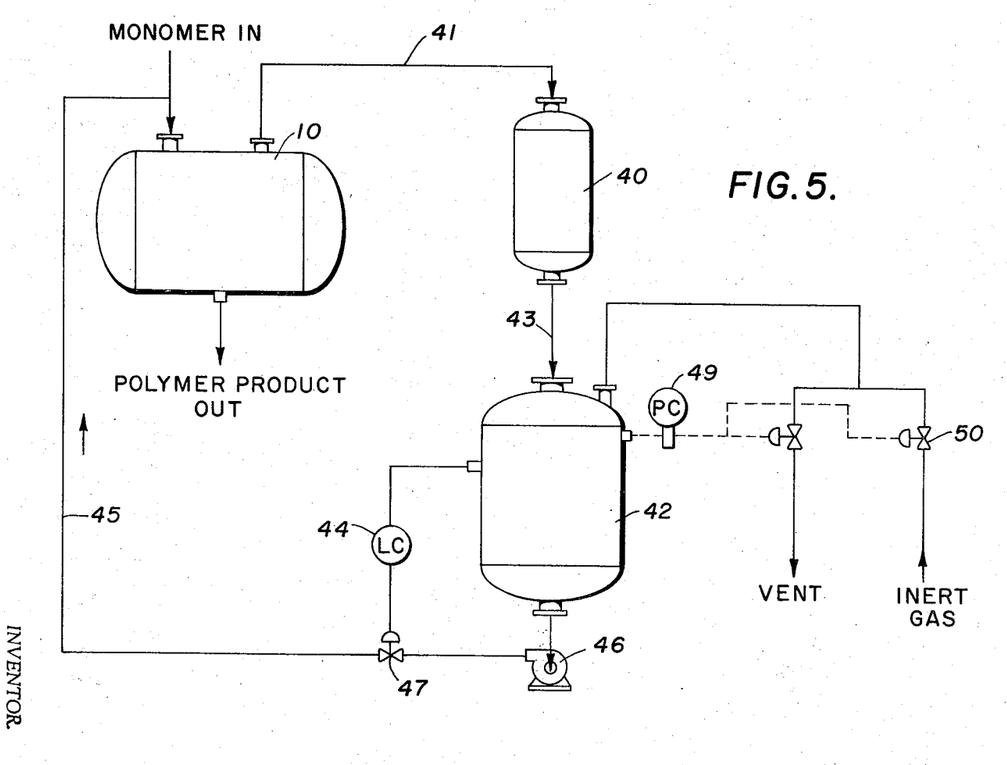
FIG. 5 is a diagram of apparatus incorporating the principles of the present invention.

Turning to FIG. 5, it is seen that a mixer/reactor 10 is connected to a reflux condenser 40 by pipe 41, pipe 41 being interconnected with the top portion of reactor 10. Condensate from condenser 40 passes into receiver 42 through line 43. The level of condensate in receiver 42 is controlled by a level controller 44 so that the fluid level in receiver 42 is maintained at a predetermined level by recycling condensate from receiver 42 to reactor 10 through line 45 via pump 46 and valve 47. The amount of vapor removed from reactor 10 is controlled by pressure controller 49. The pressure controller 49 receives an electric signal output from a pressure transducer in the vapor space of receiver 42. Controller 49 operates a split range pressure controller arrangement. Thus, when the controller 49 sends out a signal which is greater than 50 percent of a set value, the inert gas valve 50 is opened and the vent valve 51 is closed simultaneously and proportionately to the amount of signal received from pressure controller 49, as a result of which inert gas is bled into the receiver 42 and the amount of vapor taken off the reactor through line 41 is reduced. Conversely, when the output signal from pressure controller 49 drops below 50 percent of a set value, the inert gas valve 50 is closed and the vent valve 51 is opened simultaneously and proportionately, depending upon the signal from the pressure controller 49; thus, increasing the flow of vapor from reactor 10 through line 41.

A preferred polyalkenyl aromatic polymer for use in the present invention is styrene. Optionally, the monomer composition charged to a reactor 10 can comprise at least about 90 weight percent alpha-methyl styrene with the balance up to 10 weight percent thereof being alpha-methyl styrene. Preferably, the liquid phase in the reactor 10 comprises from about 63 to 69 weight percent homopolystyrene with the balance up to 100 weight percent thereof being styrene.

The reactor, or mixer/reactor, used in the present invention is seen to comprise a housing, a paddle assembly, and a drive means, all as illustrated in FIGS. 6–9.

A housing encloses an interior chamber whose walls are generally radially symmetrical to a longitudinal axis extending in a horizontal direction therethrough. The housing has at least one input port means defined in the upper half thereof, and the housing has at least one output port means defined in the lower half thereof.

A paddle assembly includes a shaft extending substantially along said longitudinal axis. Journal means, including seals, mounts said shaft in opposed end wall portions of the housing for shaft rotational movements. The paddle assembly has at least one pair of opposed blade members. Each member is affixed to said shaft and is generally equally circumferentially spaced one member from another. Each blade member generally radially extends from said shaft to near engagement with interior wall surfaces of said chamber and axially extends at least about one half the length of said chamber from one end thereof and has at least one discontinuity therein in the remaining half thereof. The paddle assembly is adapted to impart to a fluid of relatively high viscosity filling said chamber to an extent of from about 10 to 90% by volume during rotational movements of said shaft at angular velocities below the level of turbulent flow in said fluid simultaneously a combination of three types of mixing:

(a) cyclical vertical displacement of said fluid in said chamber at a cycle rate ranging from about ½ to 60 times per minute, (b) rolling action in said fluid in a peripherally located, generally horizontally extending region in said chamber which moves normally to the horizontal with a shear rate of at least about 5 sec.$^{-1}$ between said blade members and said chamber, and (c) horizontal displacement in said chamber in said fluid at an equivalent cycle rate of from about $\frac{1}{10}$ to 30 times the total volume of said fluid in said chamber.

One type involves cyclical vertical displacement in said zone such that, at a cycle rate in the range from about ½ to 60 times per minute, (a) first, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and (b) secondly, such so displaced liquid phase is subjected to a gravitational falling force by effective removal of said lifting force therefrom, the total gravitational falling force applied thereon being at least sufficient to return substantially all of such so displaced liquid phase to said gravitationally lower region before said cycle is repeated on such so displaced liquid.

A second type involves rolling action in a generally peripherally located and generally horizontally extending region in said zone, such region extending circumferentially about the entire internal periphery of said zone, and such region being continuously moving in a direction which is generally normal to the horizontal. This rolling action is produced by a similarly so moving band of pressure located adjacent to, but following behind such region, said band of pressure exerting a force on said liquid phase in said region at least sufficient to cause movement of a portion of said liquid phase in said region along a roughly cross-sectionally circular path normally away from the adjacent internal periphery of said zone adjacent to said band of pressure towards the interior of said zone a distance which is generally less than the maximum distance across said zone at a given peripheral position and then back towards said integral periphery forwardly of said band of pressure before moving towards said band of pressure. A shear rate between said internal periphery and said zone of pressure is maintained at least about 5 sec.$^{-1}$.

The third type involves horizontal displacement in said zone in a longitudinal circulatory manner at a cycle rate such that the actual volume of said liquid phase moved from one end region of said treating zone to the opposite end region thereof and back within one minute is equivalent to from about $\frac{1}{10}$ to 30 times the total volume of said liquid phase in said zone. Such equivalent volume and the horizontal circulation rate for such liquid phase so moved are, respectively, approximately proportional to said cyclical vertical displacement cycle rate in any given instance. Substantially the total volume of said liquid phase in said zone is continuously maintained under laminar flow conditions during all three types of mixing.

The mixer/reactor has drive means adapted to rotatably turn said paddle assembly on said shaft. The drive means includes a power head, and power transfer means functionally associated with said shaft.

Preferably apparatus of this invention utilizes a chamber which is cylindrical. Preferably, the apparatus has dimensions such that the ratio of the axial length of said chamber along longitudinal axis to the maximum chamber diameter ranges from about 0.5 to 3.5. Preferably, the apparatus has paddle blades which are either radially curved or are flattened. Alternatively the apparatus has paddle blades which are helically curved about the shaft. Preferably, the apparatus includes means for venting the reflux condenser whereby non-condensables in said vapor withdrawn from said chamber can be removed from said apparatus.

Figure 6:
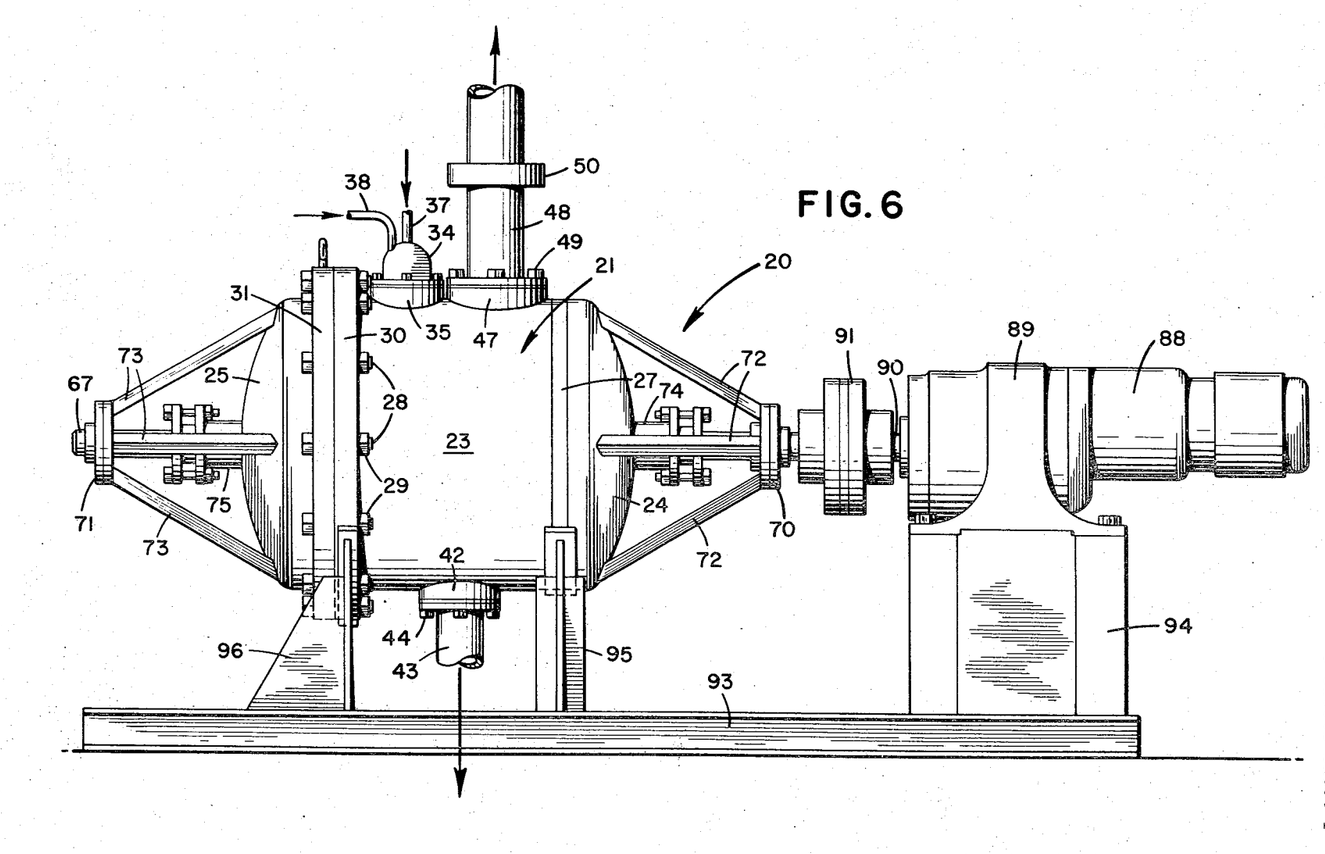
FIG. 6 is a diagrammatic side elevational view of a horizontally continuously stirred mixer reactor of the type suitable for use in the practice of the present invention.
Figure 7:
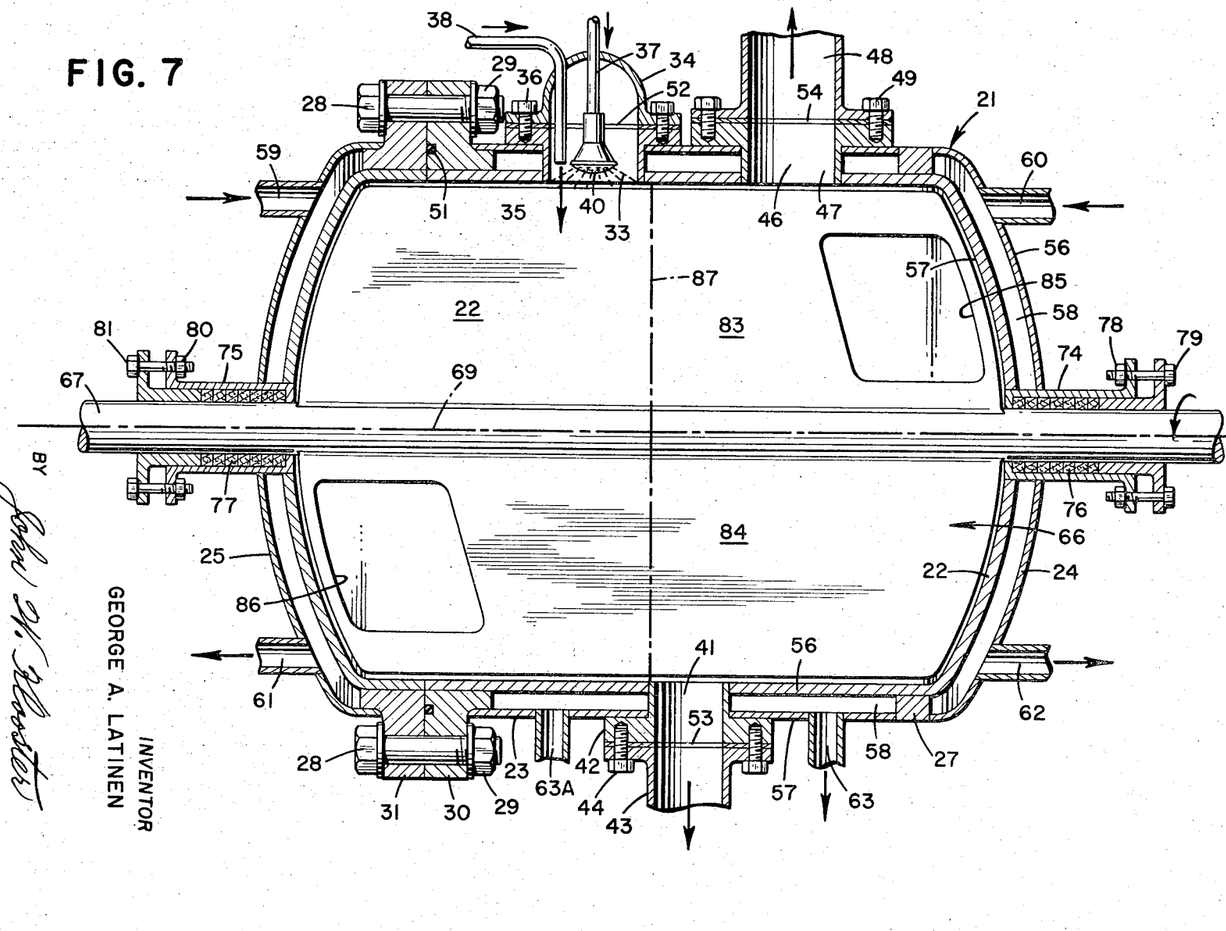
FIG. 7 is a longitudinal sectional view of the mixer shown in FIG. 6.

Referring to the drawings more particularly, there is seen in FIGS. 6 and 7 an embodiment of a mixer of this invention which is herein designated in its entirety by the numeral 20. Mixer 20 has a housing designated herein in its entirety by the numeral 21 formed of steel or the like which encloses an interior chamber 22 (see FIG. 7). Housing 21 is formed by a central cylindrical portion 23 to which are secured at opposite ends thereof heads 24 and 25, respectively. In the embodiment depicted, head 24 is secured to one end of cylindrical portion 23 by welding along flange 27, while head 25 is secured to the opposite end of cylindrical portion 23 by a series of bolts 28 with mating nuts 29 extending through adjoining flanges 30 and 31 on cylindrical portion 23 and head 25, respectively.

Housing 21 has formed therein an input port 33 located in the top mid-region of cylindrical portion 23. An appropriately flanged conduit 35 connects port 33 to a feed dome 34, conduit 35 and dome 34 being secured together by bolts 36 which extend through the flange of feed dome 34 into threaded holes in the flange of head 35. Through dome 34 extend feed pipes 37 and 38. Pipe 37 terminates within dome 34 in a spray head 40 so located as to be adapted to spray material into a wide area of chamber 22 according to a preselected pattern, while pipe 38 terminates within dome 34 in a conventional orifice (not detailed) which delivers material into chamber 22 as a stream.

Housing 21 also has formed therein an output port 41. An appropriately flanged conduit 42 connects port 41 to outlet pipe 43, pipe 43 and conduit 42 being similarly secured together by bolts 44. Pump means (not shown) may be provided to deliver material to, or to take material from, chamber 22, via feed pipe 37 and/or 38, or via pipe 43, respectively. Additional input and output ports on a mixer 20 may be employed, of course, as desired.

Housing 21 further has formed therein a vent port 46 in the top mid-region of cylindrical portion 23. An appropriately flanged conduit 47 connects port 46 to pipe 48, conduit 47 and pipe 48 being similarly secured together by bolts 49. During a mixing operation, port 46 may serve as a safety valve permitting escape of pressurized gases from chamber 22 in the event of excessive pressure build-up in housing 21, as through rupture of a rupture disc. To isolate the interior of chamber 22 from the atmosphere and prevent during operation of mixer 20 leakage of fluid therefrom, appropriate seals 51 (for head 25 and cylindrical portion 23), seal 52 (for conduit 35 and dome 34), seal 53 (for conduit 42 and pipe 43), and seal 54 (for conduit 47 and pipe 48) are provided. Vent 46 is also useful when mixer 20 is to be employed as a reactor wherein mixing of viscous fluids takes place, and wherein a reflux condenser is connected with vent 46.

Housing 21 in mixer 20 is effectively formed by two walls, an inner wall 56 and an outer wall 57 with a space 58 thus being defined therebetween. This space 58 between walls 56 and 57 is conveniently maintained by such means as flanges 30 and 31, conduits 35, 43, and 47, flange 27, and the like, with appropriate welds (not shown). Space 58 provides a cooling, or heating jacket for delivering heat to, or removing heat from, chamber 22, as desired or necessary during operation of mixer 20 by circulating a fluid coolant, such as water, or a heated fluid, such as hot oil, hot water, steam, or the like in space 58, such a cooled or heated fluid (not shown) being fed to space 58 through input ports 59 and 60, and being removed from space 58 through output ports 61, 62, 63, and 63A. Any conventional means for insulating housing 21 may be used for a mixer 20, if insulation is desired, as those skilled in the art will readily appreciate. Whether or not a mixer 20 needs insulation depends, of course, on the particular end use to which such is intended to be put in accordance with individual wishes.

Positioned and contained within chamber 22 of housing 21 is a paddle assembly designated herein in its entirety by the numeral 66. Paddle assembly 66 serves as an agitator in mixer 20 and revolves on a shaft 67. Shaft 67 in mixer 20 is generally coaxial with the longitudinal, horizontally extending axis 69 of housing 21, and extends through respective housing 21 heads 24 and 25 into conventional bearing assemblies 70 and 71, respectively. Any convenient bearing means may obviously be employed. Bearing assembly 70 is supported by and secured to, as by welding, bearing support spars 72 which, in turn, are similarly secured at their respective bases to head 24, while bearing assembly 71 is supported by and secured to, as by welding, bearing support spars 73 which, in turn, are similarly secured at their respective bases to head 25. In order to make shaft 67 be in sealing engagement with housing 21, and thereby prevent fluid leakage from housing 21 around shaft 67 during operation of mixer 20, a pair of conventional packing glands 74 and 75 are provided, one each in, respectively, head 24 and head 25, circumferentially about shaft 67. Any convenient sealing means between shaft and housing may obviously be employed. Pressure upon packing 76 and 77 in respective glands 74 and 75 is adjustable and is maintained at a predetermined value by means of tensioning nuts 78 on bolts 79 and nuts 80 on bolts 81, respectively. Thus, shaft 67 is mounted for sealed, rotational movements within housing 21.

A pair of diametrically opposed blade members 83 and 84 are each secured, as by welding, to shaft 67. Each blade member 83 or 84 radially projects from shaft 67 to near (but not actual engagement with) interior wall surfaces of chamber 22. Each blade member extends continuously and straight in an axial direction substantially without spiralling along shaft 67 in chamber 22.

The pair of blade members 83 and 84 are similarly slotted at their respectively diagonally opposite outside ends (or corners) to form slots 85 and 86, respectively. Each slot 85 and 86 can range from about 3 to 20 percent of the total effective surface area of each blade 83 and 84, respectively, in general. The exact cross-sectional size and location of the slot 85 or 86 in each blade can vary widely. Thus, a slot 85 or 86 may be open (not joined to, or circumscribed by) on one or two sides in a blade 83 or 84. In general, a slot 85 or 86 does not extend longitudinally beyond the mid-line of a blade, such as mid-line 87 of blades 83 and 84. Further, a slot 85 or 86 may extend down radially to the shaft 67 in a blade 83 or 84. A pair of blade members such as 83 and 84 is preferably mathematically symmetrical as respects location and size of slots 83 or 84. A single slot 85 or 86 may be comprised of more than one individual aperture in a blade 83 or 84, depending on circumstances, such as blade strength considerations, size, etc.

A mixer 20 is adapted to achieve and maintain substantial homogeneity and uniformity in a liquid agitated by paddle assembly 66. Preferably, a mixer 20 has a chamber 22 whose dimensions such that the ratio of the length of axis 69 in chamber 22 to the maximum diameter of chamber 22 range about 0.5 to 3.5, and more preferably, from about 1.5 to 2.5.

To rotatably drive the shaft 67, an electric motor 88 is provided which interconnects with shaft 67 through a transmission 89 and a drive shaft 90. Transmission 89 is equipped with a safety clutch 91 to prevent overloads. Clutch 91 can be considered to interconnect drive shaft 90 with shaft 67. Any convenient means may be used to rotatably drive a paddle assembly—electrical, magnetic, mechanical, or the like.

Conveniently, mixer 20 has a base 93 wherein a pedestal 94 supports the drive assembly (motor 88, shaft 90, transmission 89 and clutch 91) while leg assemblies 95 and 96 together support housing 21, paddle assembly 66 and their associated elements.

Figure 8:
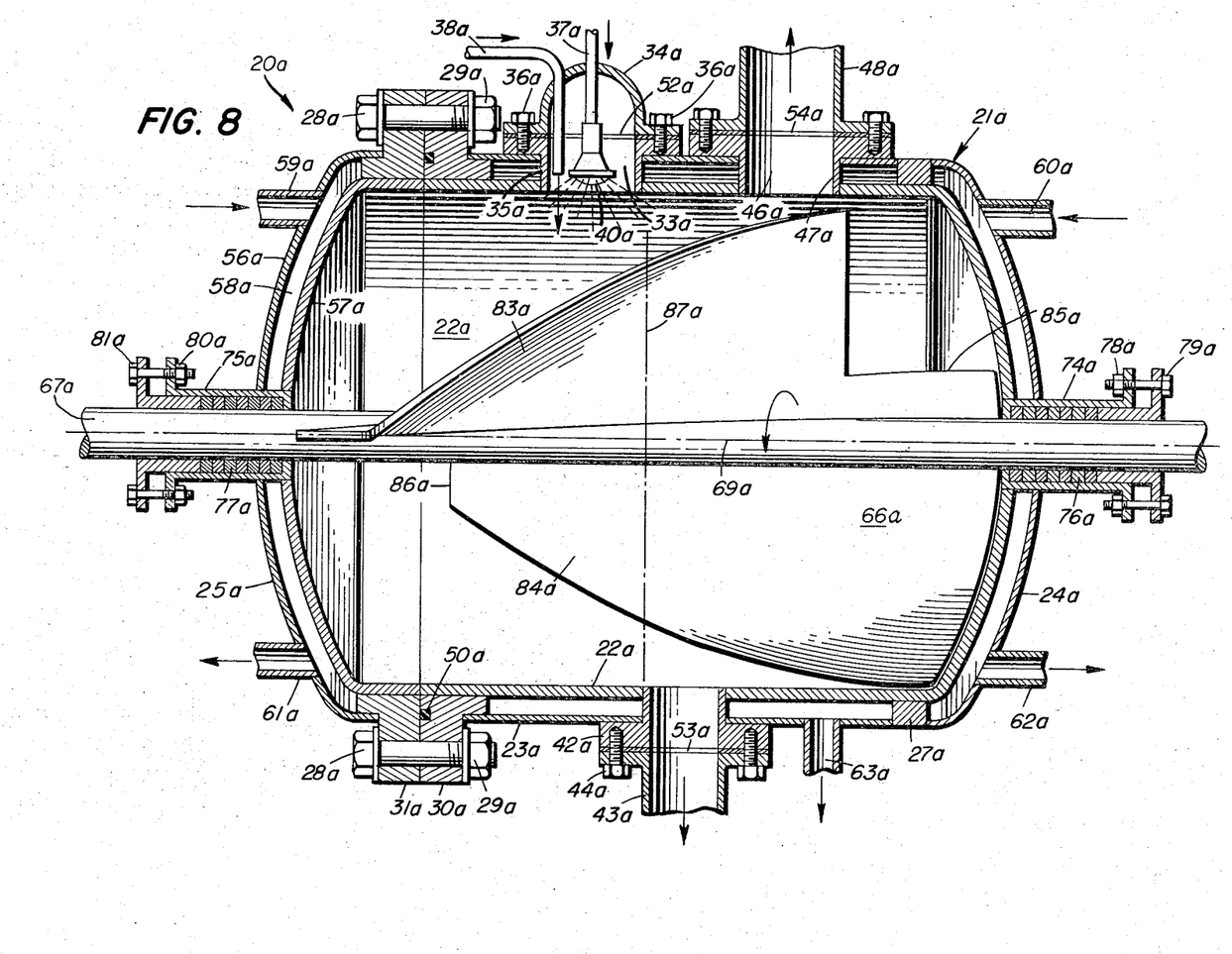
FIG. 8 is an alternative embodiment but is similar to FIG. 7.

Positioned and contained with chamber 22a of housing 21a of FIG. 8 is a paddle assembly designated herein in its entirety by the numeral 66a. Paddle assembly 66a serves as an agitator in mixer 20a and revolves on a shaft 67a. Shaft 67a in mixer 20a is generally coaxial with the longitudinal, horizontally extending axis 69a of housing 21a and extends through housing 21a, and its heads 24a and 25a into conventional bearing assemblies (not shown). In order to make shaft 67a be in sealing engagement with housing 21a, and thereby prevent fluid leakage from housing 21a around shaft 67a during operation of mixer 20a, a pair of conventional packing glands 74a and 75a are provided, one each in, respectively, head 24a and head 25a, circumferentially about shaft 67a. Pressure upon packing 76a and 77a in respective glands 74a and 75a is adjustable and is maintained at a predetermined value by means of tensioning nuts 78a on bolts 79a and nuts 80a on bolts 81a, respectively. Any convenient sealing means between shaft and housing may obviously be employed. Thus, shaft 67a is mounted for sealed, rotational movements within housing 21a.

A pair of diametrically opposed blade members 83a and 84a are each secured, as by welding, to shaft 67a. Each blade member 83a or 84a radially projects from shaft 67a to near (but not actual engagement with) interior wall surfaces of chamber 22a. Each blade member extends continuously in an axial direction and simultaneously spirals along shaft 67a in chamber 22a, the angle formed by the blade with the axis of shaft 67a ranging from 0 to about 90°, and preferably from 3 to 35°.

The pair of blade members 83a and 84a are similarly slotted at their respective diagonally opposite outside ends to form slots 85a and 86a, respectively. Each slot 85a and 86a can range from about 3 to 20 percent of the total effective surface area of each blade 83a and 84a, respectively, in general. The exact cross-sectional size and location of the slot 85a or 86a in each blade can vary widely. Thus, a slot 85a or 86a may be open (not joined to, or circumscribed by) on one or two sides in a blade 83a or 84a. In general, a slot 85a or 86a does not extend longitudinally beyond the mid-line of a blade, such as mid-line 87a of blades 83a and 84a. Further, a slot 85a or 86a may extend down radially to the shaft 67a in a blade 83a or 84a. A pair of blade members such as 83a and 84a is preferably mathematically symmetrical as respects location and size of slots 83a or 84a. A single slot 85a or 86a may be comprised of more than one individual aperture in a blade 83a or 84a, depending on circumstances, such as blade strength considerations, size, etc. Observe that paddle assembly 66a can rotate in chamber 22a either clockwise or counterclockwise. In general, it is presently preferred to operate the paddle assembly 66a so that, as assembly 66a rotates, the unslotted corner of each blade member first throws the liquid in a partially filled chamber 22a.

Figure 9:
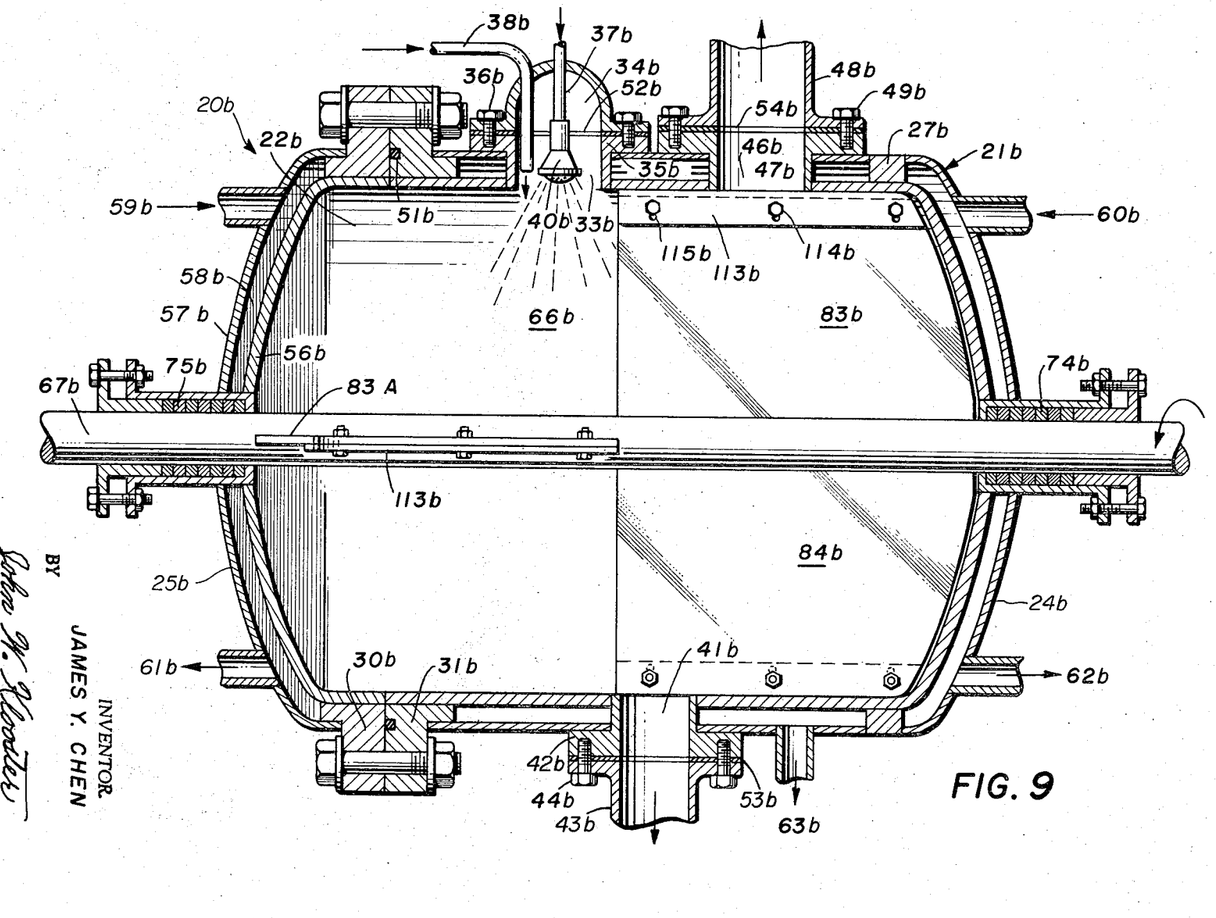
FIG. 9 is another alternative embodiment but similar to FIG. 7.
Figure 10:
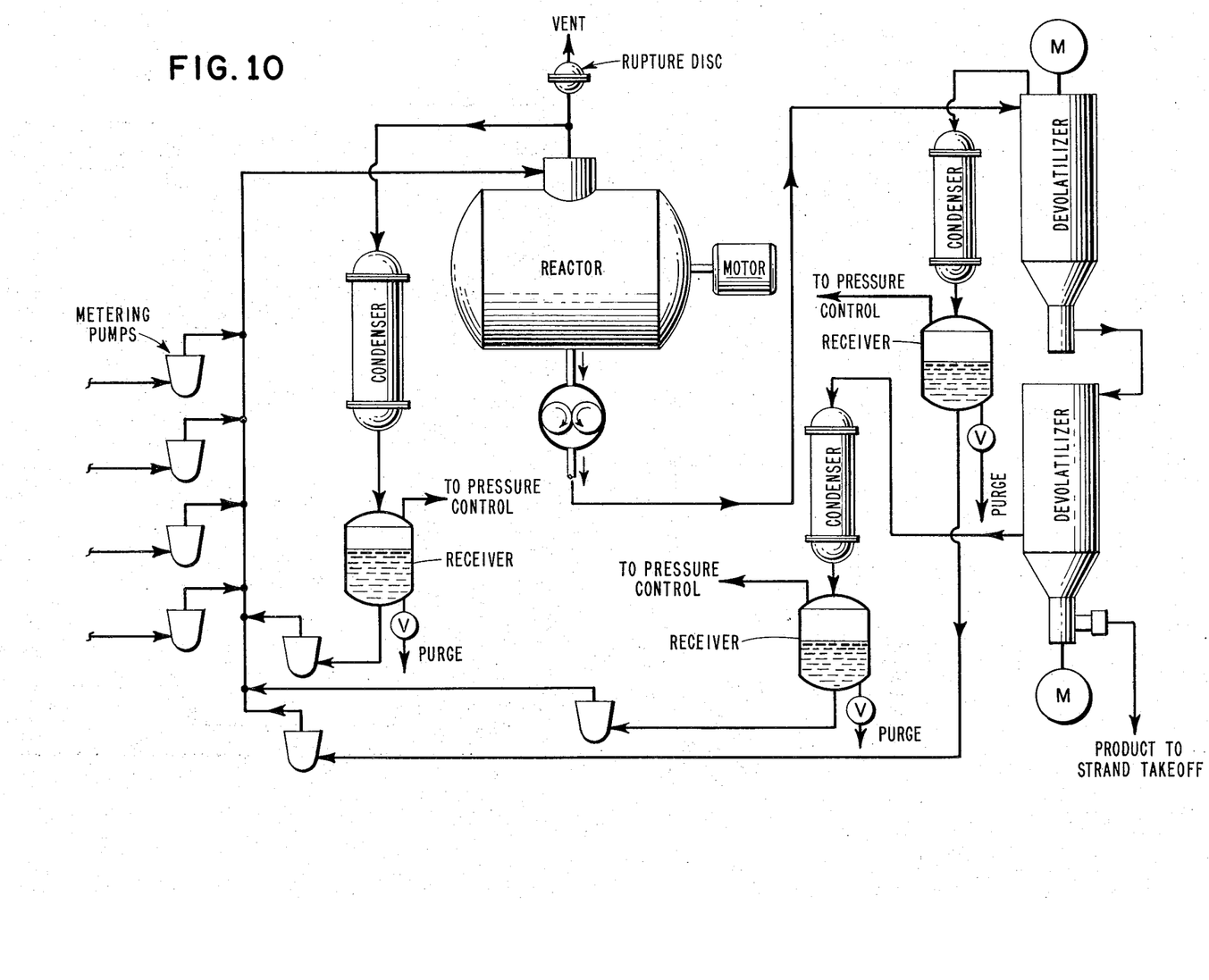
FIG. 10 is a flow diagram illustrating an application of the apparatus of this invention.

Referring to FIG. 9, positioned and contained with chamber 22b of housing 21b is a paddle assembly designated herein in its entirety by the numeral 66b. Paddle assembly 66b serves as an agitator in mixer 20b and revolves on a shaft 67b. Shaft 67b in mixer 20b is generally coaxial with the longitudinal, horizontally extending axis of housing 21b, and extends through housing 21b and its heads 24b and 25b into conventional bearing assemblies (not shown). In order to make shaft 67b be in sealing engagement with housing 21b, and thereby prevent fluid leakage from housing 21b around shaft 67b during operation of mixer 20b, a pair of conventional packing glands 74b and 75b are provided, one each in, respectively, head 24b and head 25b, circumferentially about shaft 67b. Any convenient sealing means between shaft and housing may obviously be employed. Thus, shaft 67b is mounted for sealed, rotational movements within housing 21b.

Two pairs of independent, but axially adjacent blade members, are each secured as by welding to shaft 67b. In FIG. 9, the members of one pair are designated as 83b and 84b. These blades are diametrically opposed to one another and radially project from shaft 67b to near engagement with interior wall surfaces of housing 21b. Blades 83b and 84b are generally vertical (e.g., in the plane of the paper of the drawing). The members of the other pair of blade members are in a plane perpendicular to blades 83b and 84b and only one of the blades designated as 83A currently shown in FIG. 9. Each blade member of each pair is generally continuous along its axial length and radial breadth. Each pair of blade members occupies about ½ of the interior region of housing 21b. When shaft 67b rotates, the blade members of each such pair sweep out ½ of the interior region of housing 21b. Each of the blade members in FIG. 9 extends straight along shaft 67b without spiral.

A reactor apparatus of the invention is especially adapted for use in continuous exothermic mass polymerization reactions to produce a polymer product having a substantially uniform molecular weight and chemical composition wherein, during a polymerization reaction (a) liquified, vaporizable, polymerizable materials charged to such reactor assembly are initially in a relatively low viscosity fluid condition, (b) polymer being produced therefrom is in a relatively high viscosity fluid condition, and (c) temperature/pressure conditions are such as to be above the boiling point of said polymerizable materials.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

Example 1

Figure 1:
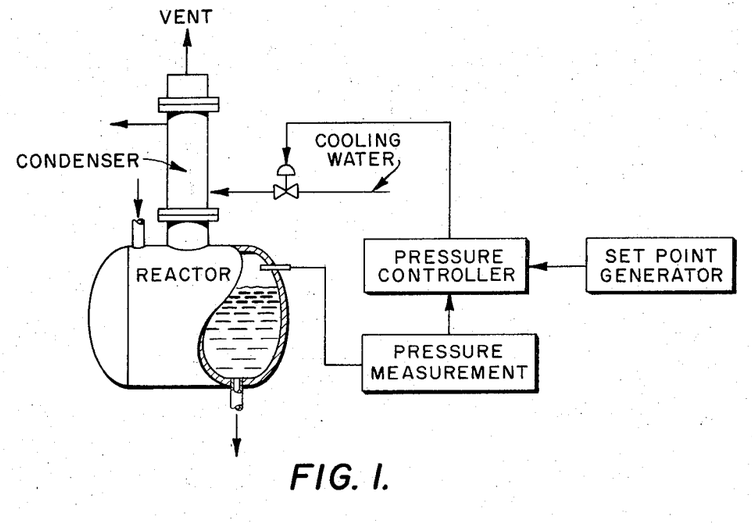
FIG. 1 is a block diagram of one embodiment of the present invention.
Figure 2:
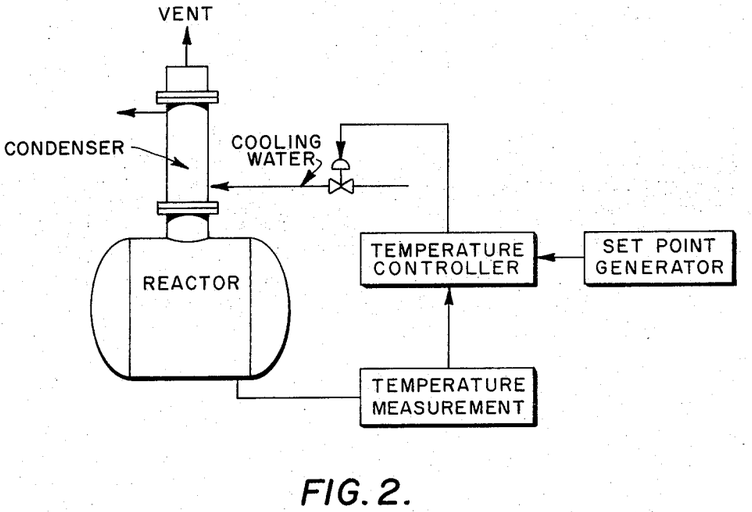
FIG. 2 is similar to FIG. 1 but shows another embodiment thereof.
Figure 3:
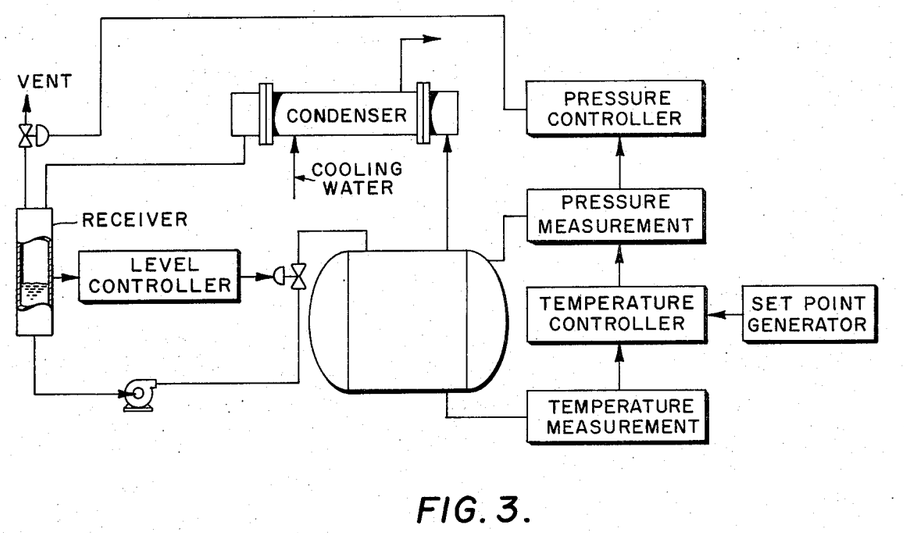
FIG. 3 is similar to FIG. 1 but shows yet another embodiment thereof.
Figure 4:
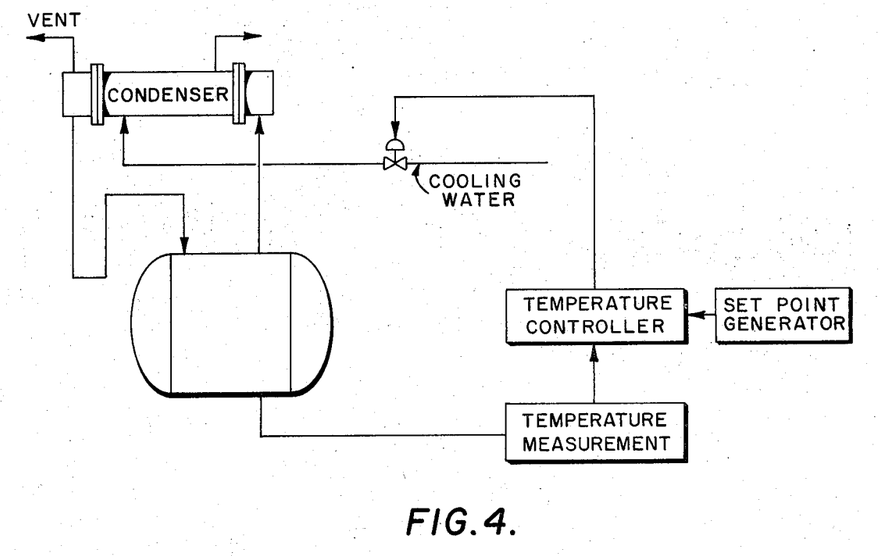
FIG. 4 is similar to FIG. 1, but shows still yet another embodiment thereof.

To a horizontal continuously stirred tank reactor of the type shown in FIG. 1 having a paddle assembly of the type shown in FIG. 7 is continuously charged, in liquid spray form, styrene monomer through an input port 33. The fresh monomer charge rate is about 50 pounds/hour and the temperature of the so-charged liquid styrene monomer is about 60° F. Concurrently, after steady state conditions are achieved, there is continuously withdrawn from the reactor through output port 41 a polymerized melt product at a flow rate of about 70.1 pounds/hour. The polymerized melt product comprises approximately 70 weight percent polystyrene having a number average molecular weight of about 115,000 (about 55,000 Staudinger) dissolved in the balance up to 100 weight percent styrene monomer. The polymer has a dispersion index of about 2.5. The polymerized melt product withdrawn from the reactor has a viscosity of about 40,000 centipoises at about 300° F. at a shear rate of about 10 sec.$^{-1}$. Hold-up time in the reactor is about 4.6 hours and the conversion rate of monomer to polymer in the reactor is about 22 pounds of polymer made per hour per pound of hold up.

The reactor is maintained at about a 65 percent volumetric fillage level based on the substantially unexpanded liquid phase at 300° F. and the paddle assembly rotates therein at about 12 r.p.m. The contents of the reactor are maintained in a substantially homogeneous and substantially isothermal condition at about 300° F. The reactor is jacketed and the fluid circulated in the jacket is maintained at about 300° F.

The reactor is equipped with reflux condenser which is interconnected with the reactor at input port 33. Vaporized styrene monomer is removed from the upper vapor phase portion within the reactor and passed into this condenser (thus passing by an input spray head in input port 33) at about 300° F. The monomer vapor is condensed and sub-cooled to about 60° F. in the reflux condenser and is then returned to the reactor. The rate of monomer vapor removal is adjusted so as to maintain the temperature in the reactor interior at about 300° F. and so as to maintain the pressure in the reactor at about 13.4 p.s.i.a. At this pressure, the volume of the viscous fluid mass in the reactor is found to be expanded by bubbles of monomer vapor therein to an extent of about 15 percent over the volume of this mass when, for example, the pressure thereof is maintained momentarily at about 15 p.s.i.a (but at about 300° F.) when it is observed that there are substantially no vapor bubbles entrained in the mass. In the reactor, the shear rate is about 10 sec.$^{-1}$, the horizontal displacement rate is about 8 times the equivalent total volume of the liquid phase per minute, and cyclical vertical displacement is about 24 times per minute.

Example 2

The procedure of Example 1 is repeated using similar conditions except that the liquid monomer composition charged to the reactor comprises 90 weight percent styrene monomer with the balance up to 100 weight percent thereof being alpha-methyl styrene. The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

Example 3

The procedure of Example 1 is repeated using similar conditions except that the liquid monomer composition charged to the reactor comprises 95 weight percent styrene monomer with the balance up to 100 weight percent being monochlorostyrene. The monochlorostyrene comprises a mixture of at least about 65 weight percent ortho-isomer with the balance up to 100 weight percent thereof being largerly paraisomer (available from the Dow Chemical Company, commercially).

The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

Example 4

The procedure of Example 1 is repeated using similar conditions except that the liquid monomer composition charged to the reactor comprises 95 weight percent styrene monomer with the balance up to 100 weight percent being parabromostyrene.

The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

Example 5

The procedure of Example 1 is repeated using similar conditions except that the liquid monomer composition charged to the reactor comprises 95 weight percent styrene monomer with the balance up to 100 weight percent being an impure orthopara-dichlorostyrene.

The polymer withdrawn from the reactor is found to have a number average molecular weight between 40,000–60,000 and a dispersion index of from about 2.4 to 2.6. The volume of the expanded viscous fluid mass in the reactor is maintained at about 10 percent above the volume of such mass when in a substantially non-expanded form.

Example 6

The procedure of Example 1 is repeated using styrene monomer except that a shear rate of about 2,000 sec.$^{-1}$ is employed. The volume of the expanded liquid is maintained about 20 percent above the volume of such fluid mass when in a substantially non-expanded form. The polymer product is found to have a molecular weight between 48,000 and 58,000.

In the foregoing examples, molecular weights are in Staudinger values unless otherwise specifically noted.

It will be appreciated that, while the embodiments of the present invention as shown and described herein are necessarily limited to a few forms of the present invention, many variations and modifications thereof are feasible and practical without departing from the spirit and scope of the present invention disclosed and claimed herein.

What is claimed is:

1. A reactor apparatus adapted for use in continuous exothermic mass polymerization reactions to produce a polymer product having a substantially uniform molecular weight and chemical composition wherein, during a polymerization reaction (a) liquified, vaporizable, polymerizable materials charged to such reactor assembly are initially in a relatively low viscosity fluid condition; (b) polymer being produced therefrom is in a relatively high viscosity fluid condition, and (c) temperature/pressure conditions are such as to be above the boiling point of said polymerizable materials, said reactor assembly comprising:
   (A) a housing enclosing an interior chamber whose walls are generally radially symmetrical to a longitudinal axis extending in a horizontal direction therethrough, said housing having at least one input port means defined in the upper half thereof, and said housing having at least one output port means defined in the lower half thereof,
   (B) a paddle assembly comprising:
      (1) a shaft extending substantially along said longitudinal axis,
      (2) journal means including seals and mounting said shaft in opposed end wall portions of said housing for shaft rotational movements, and
      (3) at least one pair of opposed blade members, each member affixed to said shaft and generally equally circumferentially spaced one member from another, each blade member generally radially extending from said shaft to near engagement with interior wall surfaces of said chamber and axially extending at least about one half the length of said chamber from one end thereof and each blade member slotted at respective diagonally opposite outside end portions thereof,
      (4) said paddle assembly being thereby adapted to impart to a fluid of relatively high viscosity filling said chamber to an extent of from about 10 to 90% by volume during rotational movements of said shaft at angular velocities below the level of turbulent flow in said fluid simultaneously a combination of
         (a) cyclical vertical displacement of said fluid in said chamber at a cycle rate ranging from about ½ to 60 times per minute,
         (b) rolling action in said fluid in a peripherally located, generally horizontally extending region in said chamber which moves normally to the horizontal with a shear rate of at least about 5 sec.$^{-1}$ between said blade members and said chamber and
         (c) horizontal displacement in said chamber in said fluid at an equivalent cycle rate of from about $\frac{1}{10}$ to 30 times the total volume of said fluid in said chamber,
   (C) reflux condenser means comprising:
      (1) tube means interconnected with the upper portion of said chamber, and
      (2) means for cooling exterior surface portions of said tube means whereby, during operation of said apparatus, vapors may be removed from said chamber and condensed, and
   (D) drive means adapted to rotatably turn said paddle assembly on said shaft including:
      (1) a power head, and
      (2) power transfer means functionally associated with said shaft, and
   (E) control means for regulating the quantity of vapor withdrawn from said chamber into said condenser, said control means including:
      (1) condition sensing means for sensing temperature and/or pressure in said housing and for generating a signal output representative thereof,
      (2) variable valve means adapted to regulate the flow of vapor from said chamber into said condenser, and
      (3) control means responsive to said signal output adapted to operate said variable valve means.

2. The apparatus of claim 1 wherein said chamber is cylindrical.

3. The apparatus of claim 2 wherein the dimensions of said chamber are such that the rate of the axial length of said chamber along longitudinal axis to the maximum chamber diameter ranges from about 0.5 to 3.5.

4. The apparatus of claim 1 wherein said paddle blades are radially curved.

5. The apparatus of claim 1 wherein said paddle blades are flattened.

6. The apparatus of claim 1 wherein said paddle blades are helically curved about said shaft.

7. The apparatus of claim 1 including means for venting said reflux condenser whereby non-condensables in said vapor withdrawn from said chamber can be removed from said apparatus.

8. The apparatus of claim 1 wherein the total slot cross-sectional area in each blade member ranges from about 3 to 20 percent of the total effective surface area of such blade member.

References Cited
UNITED STATES PATENTS

| | | | |
|---|---|---|---|
| 3,150,862 | 9/1964 | Grabauskas | 259—9 |
| 2,808,316 | 10/1957 | Hall | 23—252 R |
| 3,356,461 | 12/1967 | Lynch et al. | 23—290.5 |
| 3,211,209 | 10/1965 | Latinen et al. | 159—6 W |
| 3,228,453 | 1/1966 | Ellenberger | 159—6 W |

JAMES H. TAYMAN, Jr., Primary Examiner

U.S. Cl. X.R.

23—252 R, 263, 260; 159—6 WH, 6 W; 259—9, 10, 109, 110; 260—94.9 P